US012673008B2

(12) United States Patent
Schneider et al.

(10) Patent No.: US 12,673,008 B2
(45) Date of Patent: Jul. 7, 2026

(54) PACIFIER ATTACHMENT CLIP AND PLUSH TOY WITH PACIFIER ATTACHMENT CLIP

(71) Applicant: Trebco, LLC, Orange, CT (US)

(72) Inventors: Carla J. Schneider, Orange, CT (US); Richard Rubin, Fairfield, NJ (US)

(73) Assignee: Trebco, LLC, Orange, CT (US)

( * ) Notice: Subject to any disclaimer, the term of this patent is extended or adjusted under 35 U.S.C. 154(b) by 187 days.

(21) Appl. No.: 17/868,341

(22) Filed: Jul. 19, 2022

(65) Prior Publication Data

US 2023/0024883 A1 Jan. 26, 2023

Related U.S. Application Data

(60) Provisional application No. 63/224,195, filed on Jul. 21, 2021.

(51) Int. Cl.
*A61J 17/00* (2006.01)

(52) U.S. Cl.
CPC ........ *A61J 17/1115* (2020.05); *A61J 17/1111* (2020.05)

(58) Field of Classification Search
CPC ...... A61J 17/115; A61J 17/111; A61J 17/001; A61J 17/10; A61J 17/107; A61J 17/109; A61J 17/1111; A45F 5/00; F16B 45/022; F16B 45/036
See application file for complete search history.

(56) References Cited

U.S. PATENT DOCUMENTS

| | | | | | |
|---|---|---|---|---|---|
| 151,809 | A * | 6/1874 | Truax | A44C 5/145 | 24/600.9 |
| 325,470 | A * | 9/1885 | Young | D06F 57/00 | 254/388 |
| 492,743 | A * | 2/1893 | De Long | A01K 91/04 | 24/601.3 |
| 501,320 | A * | 7/1893 | Jencks | F16B 45/012 | 24/601.3 |
| 501,621 | A * | 7/1893 | Brosnan | F16B 45/036 | 24/601.3 |

(Continued)

FOREIGN PATENT DOCUMENTS

| | | | |
|---|---|---|---|
| EP | 1847307 | A1 | 10/2007 |
| JP | 2006271457 | A | 10/2006 |

OTHER PUBLICATIONS

The above U.S. Patents #1 and #2; U.S. Publications #1 and Foreign Patent Documents #1-2 were cited in a Nov. 3, 2022 PCT International Search Report, which is enclosed that issued in the corresponding PCT/US2002/037605.

(Continued)

*Primary Examiner* — Jason W San
*Assistant Examiner* — Rowland Do
(74) *Attorney, Agent, or Firm* — Cowan, Liebowitz & Latman, P.C.; Anastasia Zhadina

(57) ABSTRACT

A retractable clip that includes a clip portion for releasably attaching a pacifier to the clip portion, and a plurality of flexible arms extending from the clip portion, with the flexible arms being configured to non-releasably attach to a toy, wherein each of the plurality of flexible arms is configured to retain the clip portion in a retracted position relative to the toy and is further configured to flex so as to extend the clip portion relative to the toy upon application of a force.

9 Claims, 11 Drawing Sheets

(56) References Cited

U.S. PATENT DOCUMENTS

| | | | | | |
|---|---|---|---|---|---|
| 4,188,747 | A | 2/1980 | Kramer | | |
| 5,316,247 | A * | 5/1994 | Wodka | F16L 3/06 | 248/68.1 |
| 5,416,956 | A * | 5/1995 | Rubin | F16B 45/036 | 24/600.9 |
| 5,607,452 | A * | 3/1997 | Michaud | A61J 17/00 | 24/339 |
| 5,665,113 | A | 9/1997 | Decker et al. | | |
| D409,755 | S | 5/1999 | Thorpe et al. | | |
| 6,299,501 | B1 | 10/2001 | Lynch | | |
| 6,638,298 | B1 * | 10/2003 | Shefflin | A61J 17/113 | 606/234 |
| 6,666,740 | B1 | 12/2003 | Schneider | | |
| 8,857,018 | B2 * | 10/2014 | Murasaki | B68G 7/12 | 24/601.2 |
| 9,320,975 | B2 | 4/2016 | McClintock et al. | | |
| D797,300 | S | 9/2017 | Schneider | | |
| 11,103,424 | B1 * | 8/2021 | Hornthal | A61J 17/001 | |
| 2008/0135703 | A1 * | 6/2008 | Craig | A47B 96/061 | 248/229.16 |
| 2008/0215092 | A1 * | 9/2008 | Smith | A61J 17/001 | 606/236 |
| 2009/0270010 | A1 | 10/2009 | Scott et al. | | |
| 2010/0062677 | A1 | 3/2010 | Savoni et al. | | |
| 2010/0304636 | A1 * | 12/2010 | Seiz | A63H 3/02 | 446/72 |
| 2016/0199264 | A1 * | 7/2016 | Mcclintock | A63H 3/003 | 446/73 |
| 2018/0078866 | A1 | 3/2018 | Rogone | | |
| 2018/0104159 | A1 * | 4/2018 | Bredemeier | B29C 43/42 | |
| 2019/0142181 | A1 * | 5/2019 | Matsumura | B68G 7/05 | 297/452.59 |

OTHER PUBLICATIONS

PCT Written Opinion Of The International Searching Authority, dated Nov. 3, 2022 which corresponds to International Application No. PCT/US2022/037605.

* cited by examiner

PACIFIER ATTACHMENT CLIP AND PLUSH TOY WITH PACIFIER ATTACHMENT CLIP

FIELD OF THE INVENTION

The present application relates to a pacifier attachment clip for attaching a pacifier to another object, such as a toy, and to a plush toy with pacifier attachment clip which allows a user to detachably attach a pacifier to the toy.

INTRODUCTION

Pacifiers are commonly used for small children and due to their small size, it may be difficult for a child to locate the pacifier in his or her playpen. Moreover, pacifiers can fall through the slats or openings in a child's playpen. In order to reduce the risk of the pacifier falling through the slats or openings of the playpen, and to enable a child to easily locate the pacifier in his or her playpen, U.S. Pat. No. 6,666,740 describes a pacifier which is securely attached to a stuffed toy in the form of an animal or other geometric shape. In addition, U.S. Publication No. 2018/0214350, assigned to the same assignee herein, describes an improved toy and pacifier assembly that includes a pacifier attachment device for detachably attaching the pacifier to the toy.

SUMMARY OF THE INVENTION

The present invention provides a pacifier attachment clip that allows for detachable or releasable attachment of a pacifier to a plush toy. By releasably or detachably coupling the pacifier to the plush toy using the pacifier attachment clip, the pacifier may be easily replaced, or the toy may be washed without the pacifier attached, or the pacifier may be washed without also washing the toy.

In certain embodiments, the pacifier attachment clip is configured to attach to pacifiers with a particular construction. However, the pacifier attachment clip may be used with other types of pacifiers that are not limited to the specific configuration.

In the present invention, the pacifier attachment clip is a retractable pacifier attachment clip which is preferably permanently and/or non-releasably attached to the plush toy and is used for releasably or detachably coupling a pacifier to the plush toy. In the present invention, the pacifier attachment clip is positioned within a cavity in the plush toy so that it can remain hidden or partially hidden while not in use and can be exposed for attachment to a pacifier. After a pacifier is attached to the pacifier attachment clip, the clip is retracted into the cavity in the plush toy, so that all or a portion of the clip is hidden or covered by the plush toy. The pacifier attachment clip is configured to facilitate retracting of the clip, at least partially and in some embodiments wholly, into the cavity in the plush toy when not in use and/or when attached to the pacifier, and to allow the pacifier attachment clip to be pulled out, extended or pushed out from the cavity in the plush toy for attachment to the pacifier. In certain embodiments, this is accomplished by one or more flexible arms in the pacifier attachment clip, with the one or more flexible arms biasing or urging the clip toward the position within the cavity in the plush toy and being sufficiently flexible to allow extension of the clip from the cavity.

In certain embodiments, the pacifier attachment clip is configured and is attached to a toy in such a way as to cause the clip to open when the clip is operated to extend from the cavity and to close when the clip is retracts back into the cavity. This configuration of the clip and of the attachment to the toy makes it easy for an adult to attach a pacifier to the clip or to detach the pacifier therefrom, while also requiring sufficient motor skills to prevent an infant or toddler from inadvertently or intentionally detaching the pacifier from the toy.

In addition, the pacifier attachment clip of the present invention may be configured to attach to a pacifier in a secure manner that prevents inadvertent detachment and prevents or substantially reduces rotation of the pacifier around a longitudinal axis of the clip. In addition, the pacifier attachment clip may further be configured to prevent or substantially reduce up-down and/or side to side rotation of the pacifier relative to the clip, in a direction orthogonal to the longitudinal axis of the clip. With this configuration, when the pacifier is attached to the plush toy via the pacifier attachment clip, the pacifier and the plush toy can each be easily grasped by a small child and manipulated into a desired orientation.

In accordance with the present invention, the pacifier attachment clip is a retractable clip including a clip portion configured to releasably attach a pacifier to the clip portion, and a plurality of flexible arms extending from the clip portion, with the flexible arms being configured to non-releasably attach to a toy, wherein each of the plurality of flexible arms is configured to retain the clip portion in a retracted position relative to the toy and is further configured to flex so as to extend the clip portion relative to the toy upon application of a force. For example, each of the plurality of flexible arms may be configured to bias or urge the clip portion into the retracted position. The toy may be a plush toy and the flexible arms may be configured to securely attach to an interior of the plush toy.

In certain embodiments, the plurality of flexible arms includes at least a first arm and a second arm extending from a proximal end of the clip portion, wherein a majority portion of the first arm extends in a first direction and a majority portion of the second arm extends in a second direction different from the first direction. In some embodiments, the first and second arms extend in opposing directions relative to a longitudinal axis of the clip. In certain embodiments, the first and second arms are configured to flex by applying a force to pivot the first and second flexible arms closer to one another. In some embodiments, each of the first and second flexible arms comprises an undulated arm and/or an S-shaped arm.

In one illustrative configuration of the clip, the clip portion comprises a spine extending into a hook and a gate portion, the gate portion being configured to move between a closed position adjacent to the hook and an open position forming a space between the gate portion and the hook to allow for attachment of the pacifier to the clip portion. In one configuration, the spine extends from the proximal end of the clip portion to form the hook at the distal end of the clip portion and the gate portion extends from the proximal end of the clip portion toward a tip of the hook. In some configurations, the gate portion partially overlaps with the tip of the hook portion and/or is offset from the tip of the hook. Moreover, in some embodiments, a thickness of each of the plurality of flexible arms is smaller than a thickness of the spine, and/or widths of each of the plurality of flexible arms, the gate portion and the spine are substantially the same.

In certain embodiments, the pacifier includes a tab with a through opening, and the clip portion has a hook configured to pass through the through opening in the tab so as to releasably attach the pacifier to the clip portion, and a gate portion configured to move between a closed position and an open position relative to the hook. When the pacifier is releasably attached to the clip portion and the gate portion is in the closed position, the gate portion abuts a distal end of the tab so as to minimize movement of the tab relative to the hook.

The present invention also includes a toy assembly that includes a toy having a cavity formed therein and an opening for accessing the cavity, and a retractable clip including a clip portion configured to releasably attach a pacifier to the clip and at least one flexible arm configured to non-releasably attach to an interior of the toy, wherein the clip is configured to move between a retracted position and an extended position relative to the toy, and wherein in the retracted position, the at least one flexible arm is positioned inside the toy and at least a portion of the clip portion is enclosed within the cavity formed in the toy, and in the extended position, the clip portion is extended from the cavity through the opening so as to enable attachment of the pacifier to the clip. In some embodiments, in the extended position, the clip portion is extended from the cavity without exposing the at least one flexible arm. In certain embodiments, the at least one flexible arm includes first and second arms which are non-releasably secured to the interior of the toy such that the first and second arms are pivoted closer to one another when a predetermined portion of the toy is squeezed. In some embodiments, the configuration of the retractable clip in the toy assembly is similar to the above-described retractable clip.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

The following detailed description of certain embodiments will be made in reference to the accompanying drawings. In the detailed description, explanation about related functions or constructions known in the art are omitted for the sake of clarity in understanding the concept of the invention, to avoid obscuring the invention with unnecessary detail.

Figure 2:
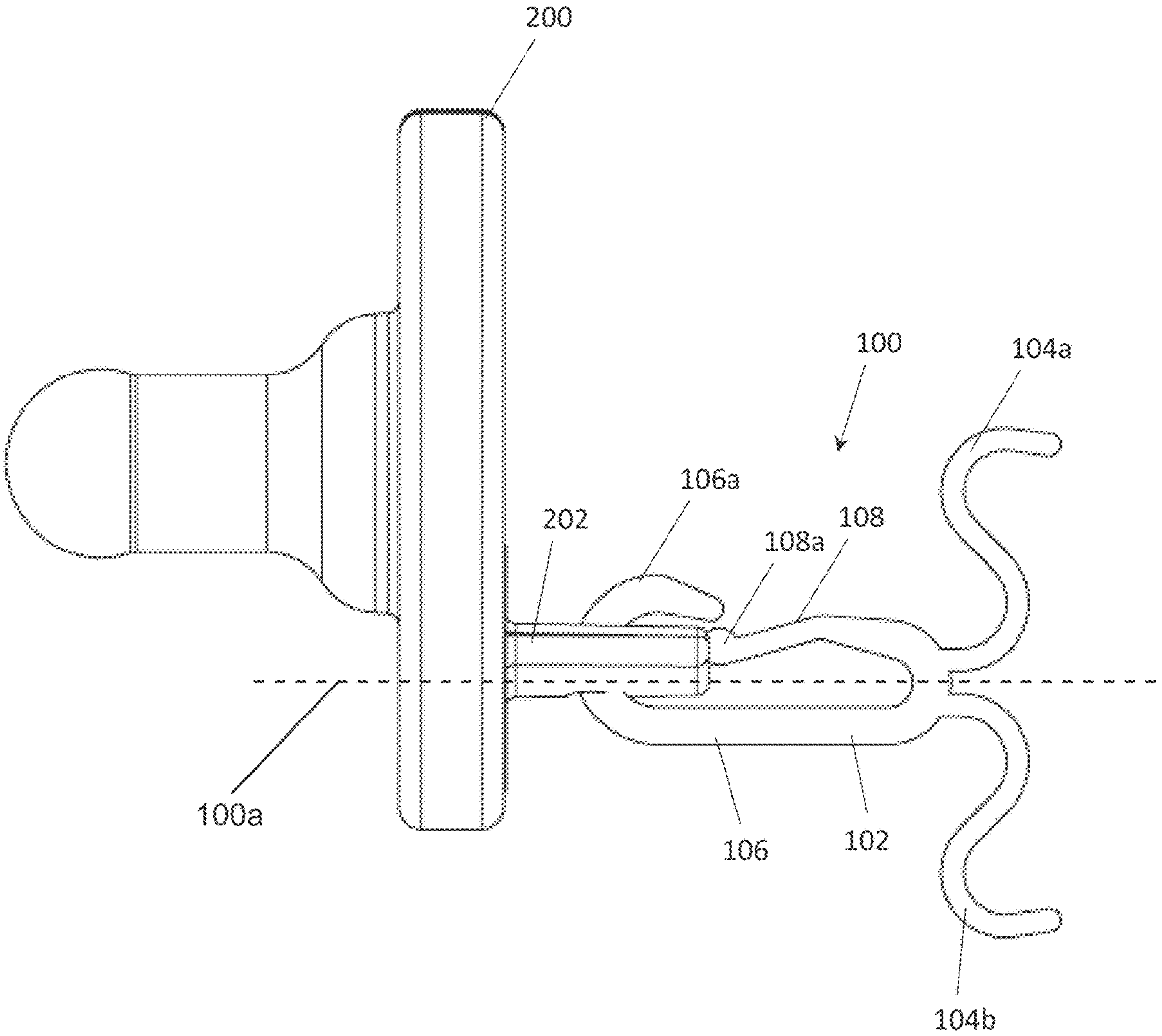
FIG. 2 shows a side view of the pacifier attachment clip of FIG. 1 detachably coupled with the pacifier.
Figure 3:
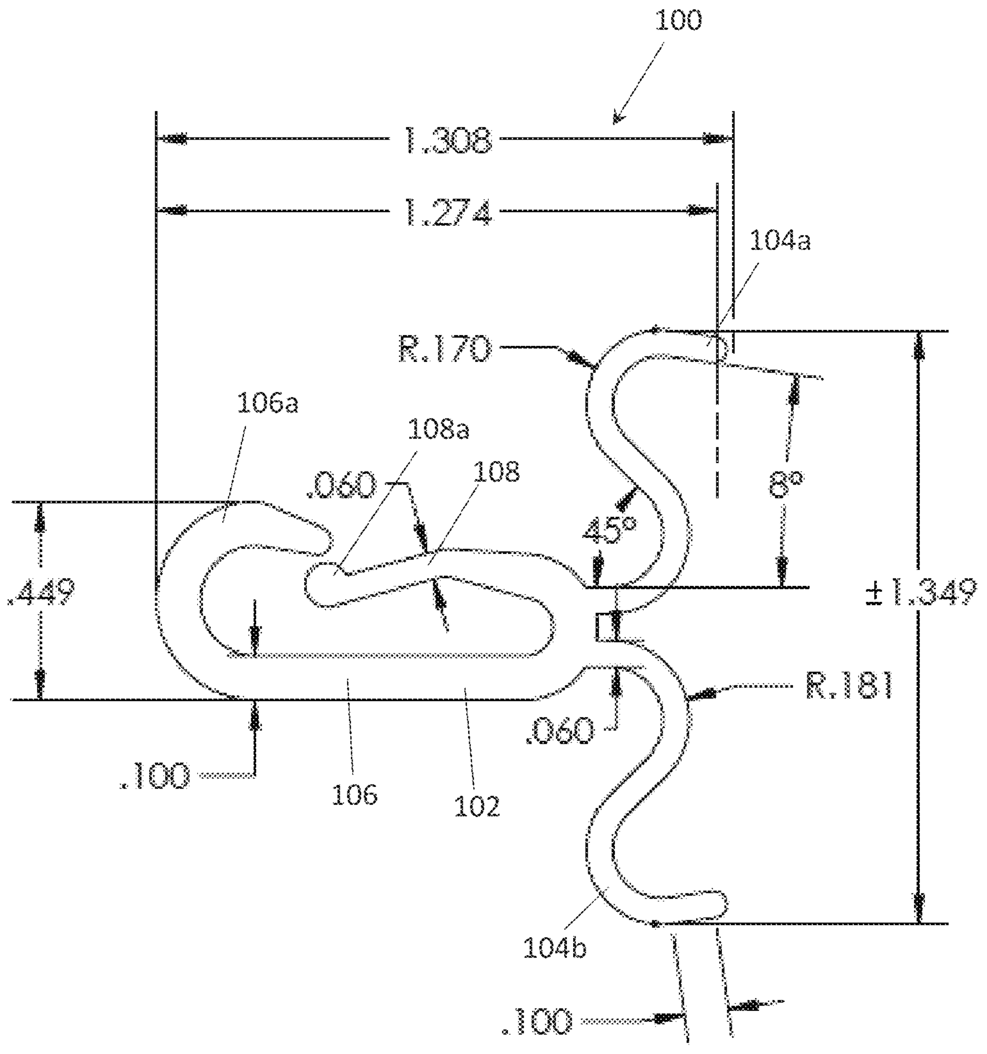
FIG. 3 shows a side view of the pacifier attachment clip of FIG. 1.
Figure 4:
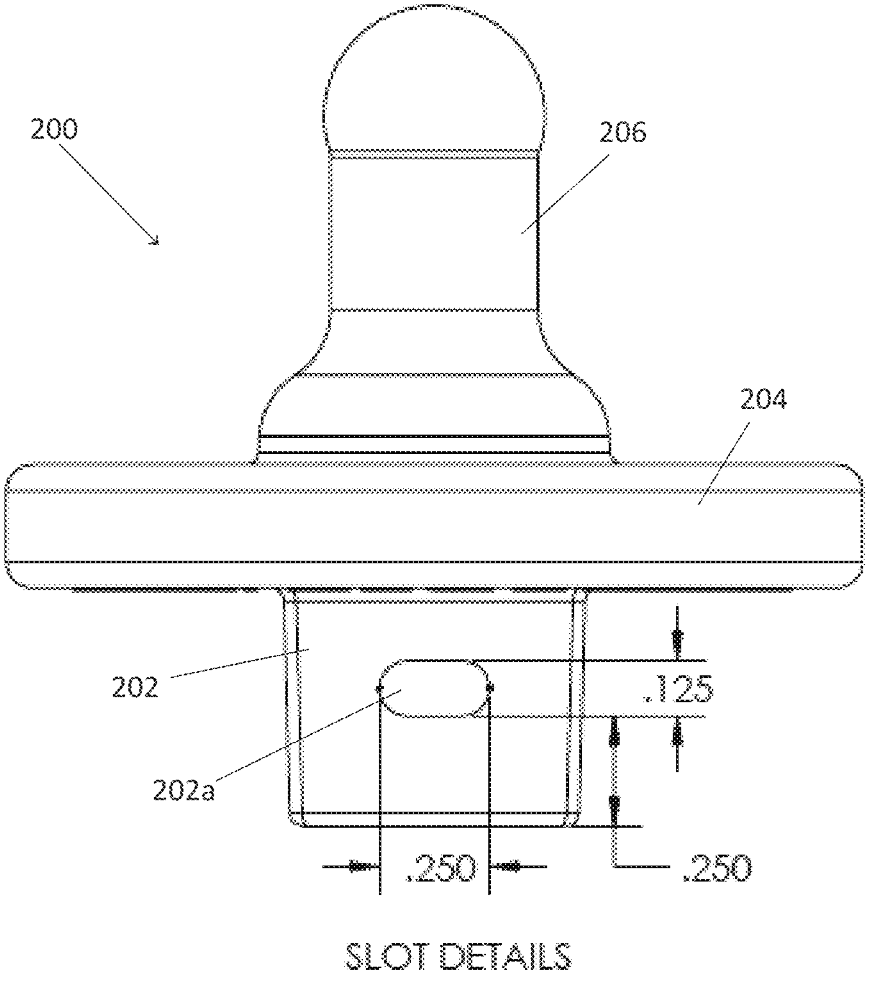
FIG. 4 shows a top view of a pacifier in FIG. 1 which is suitable for use with the pacifier attachment clip of the present invention.

FIGS. 1-3 and 5-7G show various views of a pacifier attachment clip 100 of the present invention, and illustrate releasable attachment of a pacifier 200 shown in FIG. 4 to the pacifier attachment clip 100 and positioning and attachment of the pacifier attachment clip 100 to a plush toy 300. In the present invention, the pacifier attachment clip 100 may be formed from nylon, plastic or polymer materials or any other suitable material that provides sufficient flexibility to the flexible or movable portions of the clip 100 while maintaining the structural integrity and shape of the clip 100, e.g., metallic materials. The pacifier 200 may be formed from silicone or rubber materials, or any other suitable non-toxic materials used in pacifiers. The plush toy 300 has an outer shell formed from a fabric or other suitable material and may include stuffing inside the shell to maintain the toy's shape. However, other materials such as plastic, rubber, wood, etc. may be suitable for the toy.

Figure 1:
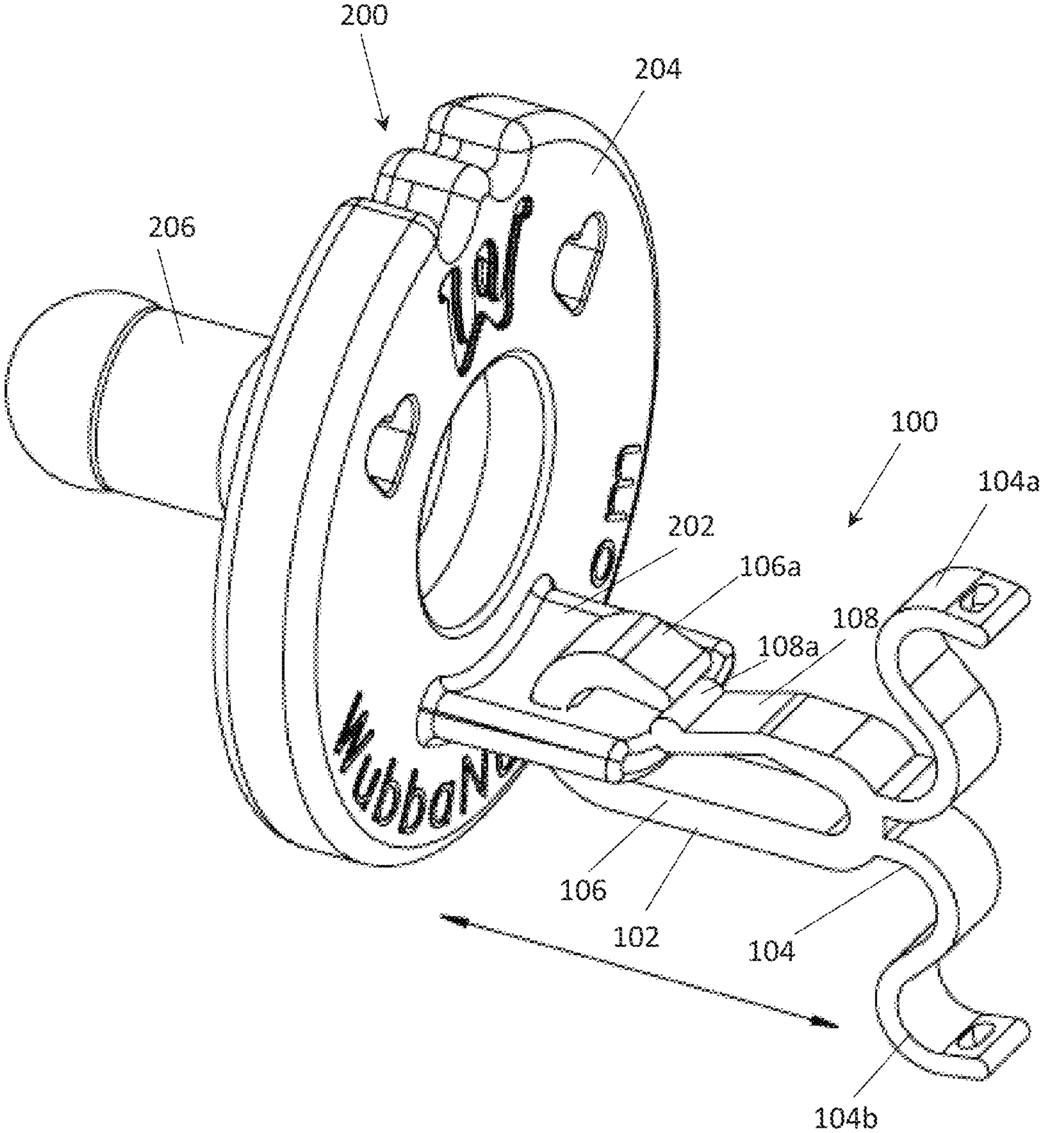
FIG. 1 shows the pacifier attachment clip of the present invention detachably coupled with a pacifier.

As shown in FIGS. 1-3, the pacifier attachment clip 100 includes a clip portion 102 configured to releasably attach to a pacifier 200, and one or more flexible arms 104 extending from the clip portion 102. In the present illustrative embodiment, the one or more flexible arms 104 include two flexible arms 104*a* and 104*b*, and the arms extend from a proximal end of the clip portion 102. However, it is contemplated that the clip may include only one flexible arm or more than two flexible arms, which may be configured similarly or differently from the flexible arms shown in FIGS. 1-3 as long as these flexible arms have substantially the same functionality. In some embodiments, the flexible arms may extend from a different area of the clip portion 102.

In FIGS. 1-3, the clip portion 102 of the pacifier attachment clip 100 includes a spine portion 106, which extends from the proximal end of the clip portion 102 to a distal end thereof and forms a hook 106*a* at the distal end of the clip portion 102. The clip portion 102 also includes a movable gate portion 108 which can be moved between a closed position, shown in FIGS. 1-3, and an open position visible in FIGS. 6A and 7C-E. The gate portion 108 is biased/urged or pivoted toward the closed position and can be opened by a user by pressing down on the gate portion 108 as shown in FIGS. 6A, 7D-E and 7G. In other embodiments, the gate portion 108 may be moved to the open position by pushing it sideways relative to the hook 106*a* or by pulling it away from the hook 106*a*. As shown in FIGS. 1-2, 6B-D and 7A-D, when the pacifier is attached to the pacifier attachment clip 100, the hook 106*a* passes through an opening in the pacifier which may be formed in a tab or a ring of the pacifier or may be formed in another location, such as an annular ring of the pacifier.

In the illustrative embodiment of FIGS. 1-3, the gate portion 108 includes a bulbous or thickened tip 108*a* at its free end, wherein the bulbous tip 108*a* does not align with a tip of the hook 106*a* and is offset relative to the tip of the hook 106*a* in a direction of the spine 106. Specifically, as can be seen in FIGS. 2-3, the bulbous tip 108*a* of the gate portion 108 is positioned closer to the central longitudinal axis 100*a* of the clip portion 102 than the tip of the hook 106*a*. In addition, the bulbous tip 108*a* of the gate portion 108 in the illustrative embodiment of FIGS. 2-3 slightly overlaps with the tip of the hook 106*a* in a lengthwise direction of the clip portion 102, which is along the longitudinal axis 100*a* of the clip portion 102. Although in some embodiments, the bulbous tip 108*a* may terminate at or adjacent to the tip of the hook 106*a* without overlapping, the configuration of the clip portion 102 shown in FIGS. 2-3 that has such an overlap provides for a more secure attachment of the pacifier to the clip. In addition, by offsetting the bulbous tip 108*a* from the tip of the hook 106*a* in a direction closer to the central longitudinal axis 100*a* of the clip portion 102, the bulbous tip 108*a* is configured to abut a tab 202 or ring of the pacifier 200, and in some configurations to press against the tab 202 or ring of the pacifier 200 so as to provide a more secure hold of the pacifier relative to the pacifier attachment clip 100. As a result, this configuration of the clip prevents or minimizes inadvertent disengagement of the pacifier from the clip 100, and prevents or minimizes rotation and movement of the pacifier relative to the pacifier attachment clip 100. In particular, this configuration of the hook 106*a* and the gate portion 108 prevent or minimize rotation of the pacifier 200 around the central longitudinal axis of the clip portion 102, reduce or minimize up-down movement of the pacifier relative to the clip portion 102 and prevent or minimize side-to-side movement of the pacifier relative to the clip portion 102 in a direction orthogonal to the central longitudinal axis of the clip portion 102.

Although in the embodiments of FIGS. 1-3, the gate portion 108 is positioned closer to the central longitudinal axis 100*a* of the clip portion than the tip of the hook 106*a*, in other embodiments, the gate portion may instead be positioned to be further away from the central longitudinal axis of the clip portion, with or without the overlap between the tip of the hook and the tip of the gate portion. In such other embodiments, the gate portion may be brought into an open position by pushing it to one of the sides or by pulling it open, i.e., pulling it away from the central longitudinal axis of the clip portion, or by pushing down on the hook.

In order to facilitate the above-described secure coupling between the pacifier attachment clip and the pacifier, in some embodiments, the pacifier 200 shown in FIG. 4 is used for attaching to the clip 100. The pacifier 200 of FIG. 4 is also visible in FIGS. 1 and 2. As shown in FIGS. 1, 2 and 4, the pacifier 200 includes an annular ring 204, a nipple 206 extending from one surface of the annular ring 204 and the tab 202 extending from another, opposing surface of the annular ring 204. The tab 202 includes a through opening or slot 202*a*, which is sized and shaped to receive the hook 106*a* of the clip portion 102. In the illustrative embodiment shown in FIG. 4, the slot 202*a* is an oval-shaped slot with a length of 0.25 inches and a height of 0.125 inches. However, the slot 202*a* may have a different size and shape from the one shown in FIG. 4. As can be seen in FIG. 1, the shape of the slot substantially corresponds to the cross-sectional shape of the hook portion 106*a* of the spine 106 and the size, i.e., width and length, of the slot 202*a* either substantially corresponds to the size of the hook portion 106*a* of the spine or is slightly larger than the hook portion 106*a* of the spine in all directions so as to allow the hook portion 106*a* to be inserted into the slot 202*a*. In certain embodiments, the size and shape of the slot may be selected so that the hook portion 106*a* fits snugly within the slot in the tab 202 so as to reduce movement of the pacifier 200 relative to the clip portion 102. In the present illustrative embodiment of FIGS. 1 and 4, the shapes and sizes of the slot 202*a* and of the hook portion 106*a* minimize the rotation and movement of the pacifier 200 relative to the clip portion 102. In other embodiments, the shape of the slot 202*a* may be different from the cross-sectional shape of the hook portion 106*a* and/or the size of the slot 202*a* in one or more directions may be larger than the hook portion 106*a*, depending on the configuration of the pacifier. For example, pacifiers that include a ring instead of a tab may be used with the clip of the present invention as long as the hook 106*a* of the clip can pass through the opening in the ring.

In addition, the positioning of the slot 202*a* along the length of the tab 202 may be selected such that when the hook 106*a* is inserted into the slot 202*a*, the bulbous tip 108*a* of the gate portion 108 abuts the distal end of the tab 202. That is, the distance between the distal end of the tab 202 and the slot 202*a* in the tab is selected so that the bulbous tip 108*a* of the gate portion 108 abuts or presses against the distal end of the tab 202 when the pacifier is attached to the clip 100. In this configuration, the coupling between the pacifier and the clip portion 102 is secure and the movement of the pacifier relative to the clip portion is minimized. At the same time, if an adult wishes to remove the pacifier 200 from the clip 100, such removal can be easily accomplished by pressing on the gate portion 108 of the clip portion 102 to open the gate between the tip of the hook portion 106*a* and the bulbous tip 108*a* so that the pacifier 200 can be disconnected from the clip 100.

As shown in FIGS. 1-3 and mentioned herein above, one or more flexible arms 104 arms extend from the proximal end of the clip portion 102. Each flexible arm 104 is configured to be coupled to a plush toy, e.g., inside the plush toy, at one end and to hold the clip 100 at least partially within a cavity in the plush toy. Each flexible arm 104 can be flexed and extended by applying a pulling force to the clip 100, such as by pulling the clip portion 102, or by pressing on the flexible arms 104 so as to pivot the flexible arms 104 toward one another to bring the ends attached to the plush toy closer together, thus causing the clip 100 to be accessible from or extend from a cavity in the plush toy as described in more detail below. Specifically, when the flexible arm 104 is in the extended and flexed state, the overall length of the clip 100 is increased so that the clip portion 102 can be exposed from the cavity in the plush toy. When the pulling force is no longer applied to the clip or when the pushing force is no longer applied to the flexible arms 104, the flexible arms 104 independently retract and return to their original, unflexed state, which causes the clip portion 102 to be at least partially retracted back into the cavity in the plush toy. Thus, the one or more flexible arms 104 of the clip function as biasing elements (or biasing arms) or springs and/or as pivots that push the clip portion 102 out of the cavity in the plush toy so that the user can access it.

In the illustrative embodiment shown in FIGS. 1-3, the clip 100 includes two flexible arms 104*a*, 104*b* extending from the proximal end of the clip portion 102 in opposing directions relative to the central longitudinal axis 100*a* of the clip 100. In some embodiments, the flexible arms 104*a*, 104*b* may extend in directly opposite directions from one another, while in other embodiments, the flexible arms 104*a*, 104*b* generally extend in opposing or different directions relative to the longitudinal axis 100*a* of the clip 100 so that the flexible arms 104*a*, 104*b* are provided at an angle relative to each other, e.g., an angle smaller or larger than 180 degrees. In the illustrative example of FIGS. 1-3, proximal ends of the flexible arms 104*a*, 104*b* connected to the proximal end of the clip portion 102 are spaced from one another. Each flexible arm 104*a*, 104*b* has an S-shape, generally extending in a direction away from the longitudinal axis 100*a* of the clip 100. In the illustrative example of FIGS. 1-3, one flexible arm 104*a* extends in a first, upward direction, which substantially corresponds to a direction in which an outer surface of the gate portion 108 faces, while the other flexible arm 104*a* extends in an opposing, downward direction in which an outer surface of the spine 106 faces. In other embodiments, however, the flexible arms 104*a*, 104*b* may extend in opposing directions in other orientations relative to the longitudinal axis 100*a* and relative to the clip portion 102, e.g., side-to-side. In yet other embodiments, the flexible arms 104*a*, 104*b* may extend at an angle relative to one another and at an angle to the central longitudinal axis 100*a*. As mentioned herein above, in other embodiments, the clip 100 may include only one flexible arm instead of a pair of arms or may include more than two flexible arms. For example, three or four flexible arms may be provided in the clip 100, with the arms extending in different directions away from and/or at an angle to the central longitudinal axis 100*a* of the clip. In another example, a single flexible arm may be provided positioned along or substantially parallel to the central longitudinal axis 100*a* of the clip or at an angle to the central longitudinal axis 100*a*, and the flexible arm may have an undulating, zigzag or helical coil configuration that allows for extension and retraction of the arm.

The S-shape of the flexible arms 104*a*, 104*b* allows the arms 104*a*, 104*b* to be bent when the arms are pivoted toward one another, and/or flexed and extended, and in some embodiments straightened or partially straightened, by applying a pulling force to the clip portion 102 so as to cause the clip 100 to extend in the pulling direction. The flexible arms 104*a*, 104*b* may also be flexed by pressing on the flexible arms 104*a*, 104*b* so as to pivot and/or bend the flexible arms and to bring the distal ends thereof, i.e., ends attached to the inside of the toy, closer together, which elongates the clip generally and causes the clip 100 to extend out. In other embodiments, the flexible arms may have other shapes, including shapes with multiple undulations, zig-zag shapes, spiral or helical shapes, and in some cases, the flexible arms may be substantially straight or somewhat curved, so long as the arms can be elongated and extended or pivoted toward each other by applying a suitable force to the clip, thus elongating the overall length of the clip along its longitudinal axis 100*a*. In the present embodiment, with the configuration in which the arms extend transversely to the longitudinal axis 100*a* of the clip in different directions, the overall length of the clip can be elongated so as to make it retractable from the toy. However, in other embodiments, the flexible arms may extend at a different angle relative to the longitudinal axis 100*a* of the clip or may not extend transversely to the longitudinal axis 100*a* of the clip and instead may extend substantially along or parallel to the longitudinal axis 100*a* of the clip. For example, the clip may include one or more spiral-shaped or zig-zag shaped arms extending from the proximal end of the clip portion 102 and extending either along the longitudinal axis 100*a* of the clip 100 or at an angle relative to the longitudinal axis 100*a*.

As shown in FIG. 1, each flexible arm 104*a*, 104*b* includes a through opening 105 in the free distal end thereof to allow for easy attachment of the flexible arms 104*a*, 104*b* to the plush toy, such as by sewing or similar attachment techniques. However, in some embodiments, the openings may be omitted and the flexible arms 104*a*, 104*b* may be attached by the same or other sewing techniques, or by using adhesives, heat, etc.

In the illustrative embodiment shown in FIG. 1, each flexible arm 104*a*, 104*b* has the same or substantially the same width as the clip portion 102 and has a smaller thickness than the width. This width of each flexible arm 104*a*, 104*b* results in reduced impediments when the clip 100 is pulled out of a cavity in a toy and minimizes the possibility of catching of the clip surfaces on the fabric of the toy, particularly around the cavity openings. The smaller thickness of each arm 104*a*, 104*b* than the width thereof provides flexibility to the arms so as to allow the arms to be extended with a relatively small pulling or pushing force. In other embodiments, the widths of the flexible arms 104*a*, 104*b* may be smaller or greater than the width of the clip portion and may include gradual changes or ramps from one width to another.

FIG. 3 shows exemplary dimensions of the clip 100 in inches and degrees. In the exemplary embodiment of FIG. 3, each flexible arm 104*a*, 104*b* has a thickness of 0.06 inches, and extends such that the central portion of the arm 104*a*, 104*b* connecting the two curves of the S-shape is at about a 45-degree angle relative to the longitudinal axis 100*a* of the clip and a free end of each arm is angled at about 8 degrees relative to the longitudinal axis of the clip. In addition, in each exemplary flexible arm 104*a*, 104*b*, a first curve closer to the connected end of the arm has a radius (R) of about 0.181 inches, and a second curve closer to the free end of the arm has a radius (R) of about 1.170 inches. It is understood that the dimensions of the clip 100 shown in FIG. 3 are exemplary and that other dimensions may be suitable and that the dimensions may be adjusted as long as the functionality of the clip is maintained.

As also shown in FIG. 3, in the exemplary embodiment shown, the overall length of the clip 100 when the flexible legs are in the retracted, unflexed state is about 1.308 inches and the overall height of the clip 100 is about 1.349 inches. In addition, the clip portion 102, and in particular, the hook 106*a* of the clip portion has a height of about 0.449 inches. As shown in FIG. 3, the spine portion 106 of the clip portion 102 has a greater thickness than the gate portion 108, which allows the spine portion 106 to be more rigid than the gate portion 108. In the illustrative embodiment of FIG. 3, the thickness of the spine 106 portion is 0.1 inch, while the thickness of the gate portion 108 is 0.060 inches.

Figure 5:
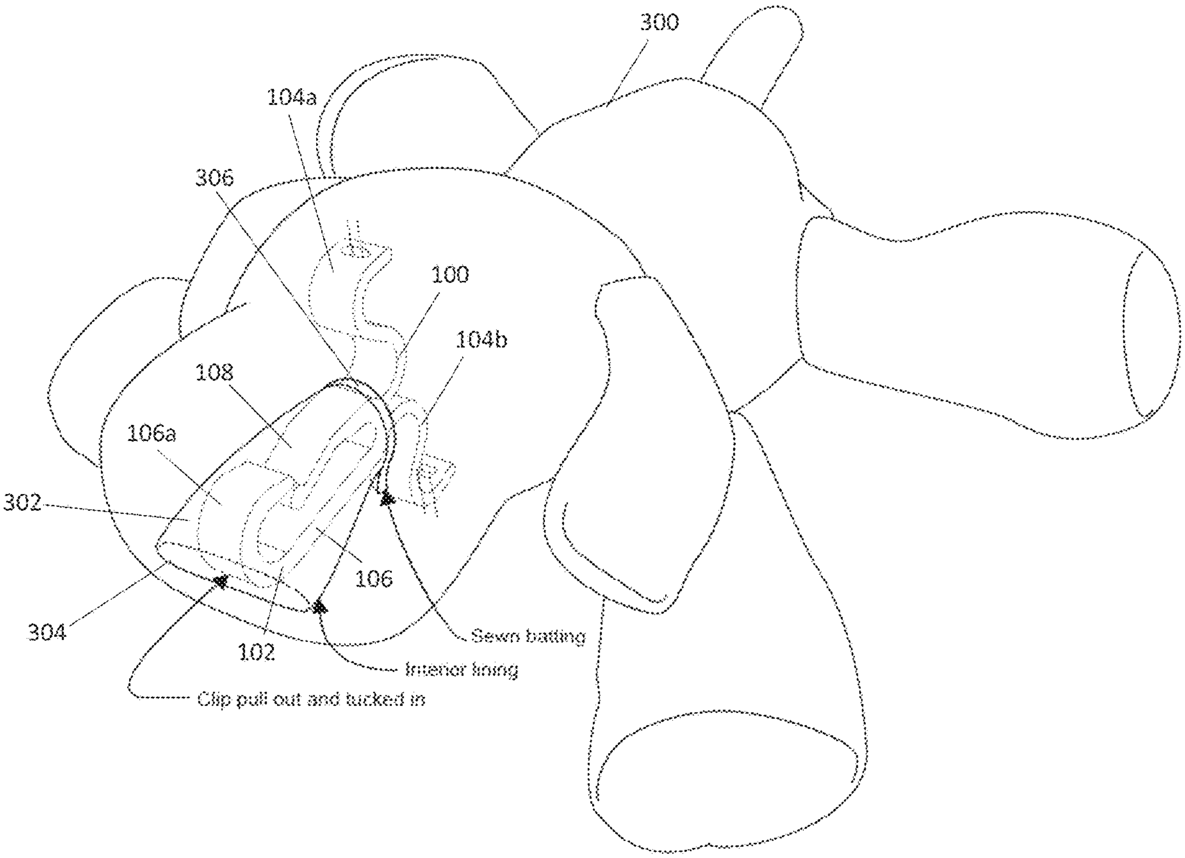
FIG. 5 shows the pacifier attachment clip of FIG. 1 being used with a plush toy.

FIG. 5 shows a combination of the clip 100 and a plush toy 300 (a clip and toy assembly) and demonstrates an illustrative attachment of the clip 100 to the plush toy 300. In FIG. 5, the clip is attached to a head portion of the plush toy, but in other embodiments, the area of attachment of the clip to the plush toy may be different, such as an extremity, e.g., a leg, or a torso. The plush toy 300 has an outer shell forming a main body of the toy, which may be filled with natural or synthetic fill or stuffing, or in some embodiments may be left unfilled.

As shown in FIG. 5, the plush toy 300 includes a cavity 302 or a pocket formed therein, which is configured to fully or partially enclose the clip portion 102 of the clip 100 when the clip is in the relaxed and retracted state. The cavity 302 includes an external opening 304 through which the clip 100 can be accessed by the user to be pulled out of the cavity 302 by applying a pulling force to the clip portion 102. Alternatively, the clip 100 can be accessed by the user pressing on the plush toy in the area of the clip attachment so as to cause the flexible arms 104*a*, 104*b* to be pressed and pivoted closer together and to cause the clip portion 102 to extend out of the cavity.

In the illustrative embodiment of FIG. 5, the cavity 302 is within the outer housing of the toy and is shaped as a tunnel with an oval-shaped or round-shaped external opening 304. The external opening may instead be slit-shaped. The cavity 302 in FIG. 5 is configured to accommodate the clip portion 102, or a portion thereof, and may also be large enough to accommodate the pacifier tab (not shown in FIG. 5) or a portion thereof when the pacifier is connected to the clip 100. In some configurations, when the pacifier is connected to the clip 100 and the clip 100 is retracted back from its extended position, the external opening 304 fits around the pacifier tab attached to the clip portion and the tunnel-shaped cavity 302 encloses all or at least a portion of the pacifier tab and the clip portion 102. In addition, in some embodiments, the cavity 302 is sized to enclose the whole clip portion 102 of the clip and the oval-shaped opening 304 is sized so as to fit snugly around the pacifier tab and to prevent the clip portion 302 from being exposed and removed from the cavity 302. In such embodiments, when the oval-shaped opening 304 is squeezed to open it, i.e., to make it more rounded, the opening 304 becomes wide enough for the clip portion 102 to be pulled out of the cavity 302 in order to release the pacifier.

In other embodiments, the cavity 302 partially encloses the clip portion 102 in a relaxed or unflexed state, so that a portion of the hook 106*a* is visible outside the cavity 302 through the opening. In this configuration, when the pacifier is connected to the clip portion, most or all of the pacifier tab is exposed outside of the cavity and the clip portion 102 is easy for the user to access, while the gate area between the hook tip 106*a* and the gate portion 108 is hidden in the cavity 302.

In some embodiments, the cavity 302 is lined with an interior lining that separates the cavity 302 from a main body of the toy and from the fill within the main body. The interior lining may be formed from the same material as the outer main body so as to create a continuous appearance when the interior lining is exposed, or it may be formed from a different material and/or from a material of a different color than the main body of the plush toy.

In addition, as shown in FIG. 5, the cavity 302 also includes an internal opening 306 configured to fit tightly around the proximal end of the clip portion 102 so that the flexible legs 104*a*, 104*b* extend through the internal opening 306 into the internal compartment of the main body of the toy. The flexible legs 104*a*, 104*b* are attached to internal walls or to other portions within the internal compartment of the main body of the toy. In certain embodiments, extra batting is sewn around the internal opening 306 so as to provide additional cushioning and to provide sealing that prevents removal of the fill material from the internal compartment of the main body. In some embodiments, the batting may also be used to prevent the flexible legs 104*a*, 104*b* from passing through the internal opening 306 when the clip portion 102 is extended from the cavity.

In certain embodiments, when the clip portion 102 is pulled out or pushed out of the cavity 302 in the toy, the flexible legs 104*a*, 104*b* are flexed so as to extend (by pivoting and/or straightening or partially straightening), and to cause the cavity 302 to partially invert outwardly so that the clip portion 102 can be exposed and accessed by the user. When the clip portion 102, and in particular the hook 106*a* of the clip portion, is exposed, a pacifier can be attached to the hook 106*a* of the clip portion by passing the hook 106*a* through an opening in the pacifier tab or ring. After the clip portion 102 is attached to the pacifier, the flexible legs 104*a*, 104*b* are retracted back to their original configuration so that the cavity 302 returns to its original position within the main body of the plush toy and the clip portion 102, or a portion thereof, is retracted back into the cavity 302.

In other embodiments, the flexible legs 104*a*, 104*b* are allowed to extend and pass through the internal opening 306 of the cavity when flexible legs 104*a*, 104*b* are flexed, so that the clip portion 102 is extended from the cavity 302. In these embodiments, after a pacifier is attached to the clip portion 102, the flexible legs 104*a*, 104*b* are allowed to return to their original, unflexed position by passing back into the internal compartment of the toy through the internal opening 306 so as to tuck the clip portion 102 back into the cavity 302.

As discussed above, in the present illustrative embodiment, the flexible legs 104*a*, 104*b* have the same or substantially the same width as the clip portion 102 and are spaced apart from one another at the point of attachment to the proximal end of the clip portion 102. With this configuration, the flexible legs 104*a*, 104*b* seal off the internal opening 306 from the outside in order to prevent any fill material from being removed from the internal compartment of the main body. In addition, in the embodiments which allow the flexible legs 104*a*, 104*b* to be extended and pulled through the internal opening 306, the configuration of the proximal end of the clip portion 102 and the attachment of the flexible legs 104*a*, 104*b* thereto block off, or seal off, the internal opening 306 in the plush toy so as to prevent any fill material from being removed.

Similar to the process of attaching the pacifier 200 to the clip 100, in order to detach the pacifier 200 from the clip 100, the clip portion 102 attached to the pacifier tab is pulled out or pushed out of the cavity 302 in the plush toy so as to allow the pacifier to be detached from the clip portion 102. When the clip portion 102 is extended from the cavity 302, in one embodiment, the flexible legs 104*a*, 104*b* are pivoted so as to be brought closer to one another and to cause the cavity 302 to partially or fully invert and to extend and expose the clip portion 102. In other embodiments, when the clip portion 102 is extended from the cavity, the flexible legs 104*a*, 104*b* are brought closer together, flexed and pass through the internal opening 306. After the pacifier tab is detached from the clip portion 102, the clip portion 102 retracts back into the cavity 302 and the flexible legs 104*a*, 104*b* contract so as to be retracted back to their original position.

Although the cavity 302 in the illustrative embodiment of FIG. 5 is within the outer housing of the plush toy, in other embodiments, the cavity 302 may be formed as a pocket attached to the outer housing of the plush toy. In such embodiments, the cavity 302 includes the external opening through which the clip portion can be extended of the cavity 302, and an internal opening which opens into the main compartment of the plush toy. The configuration of the clip used with the pocket cavity configuration may be the same as the clip shown in FIGS. 1-3 and 5.

Figure 6A:
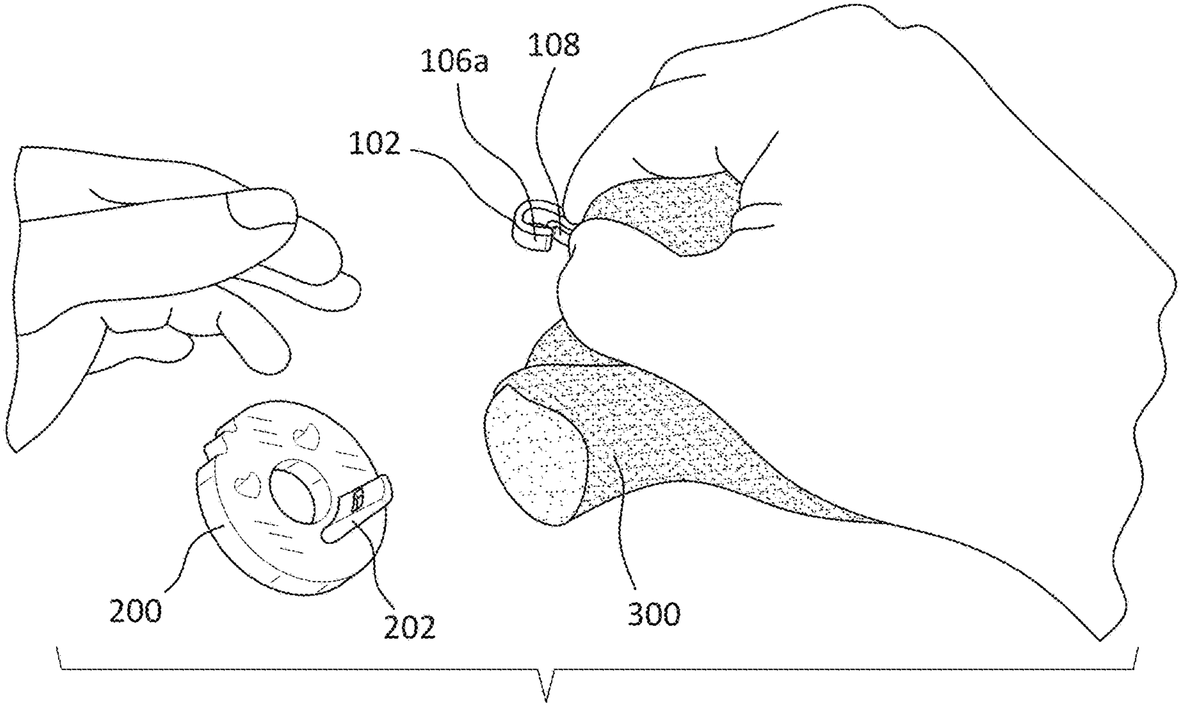
FIGS. 6A-6D show a process of attaching the pacifier to the clip, which is non-releasably attached to the plush toy.
Figure 6B:
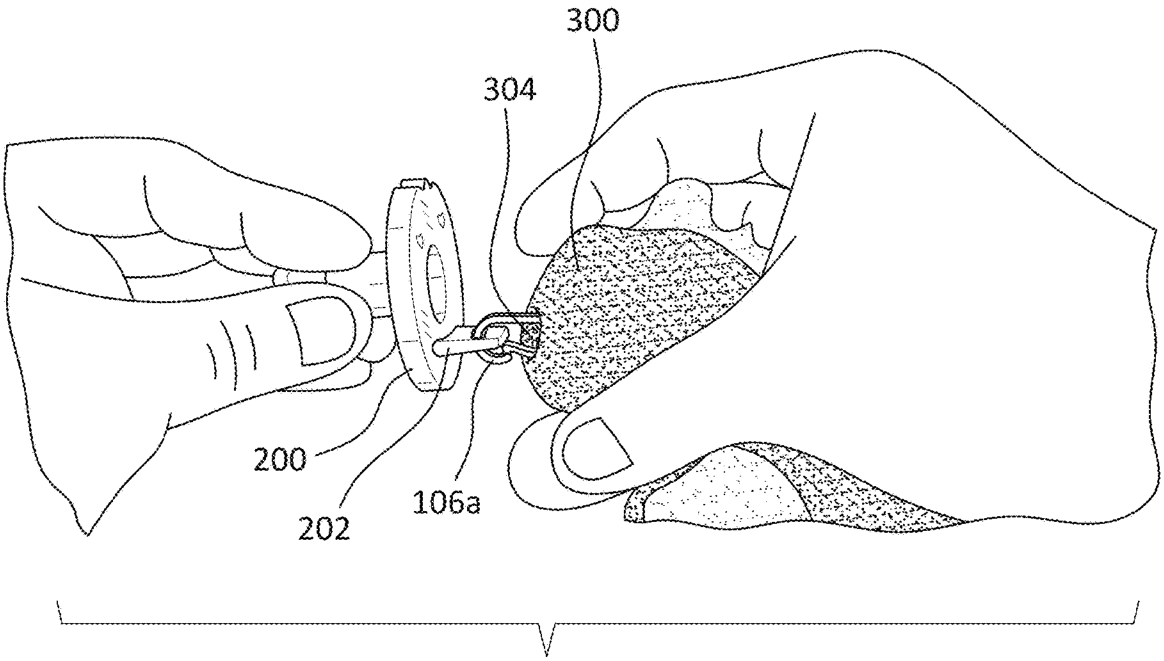
Figure 6C:
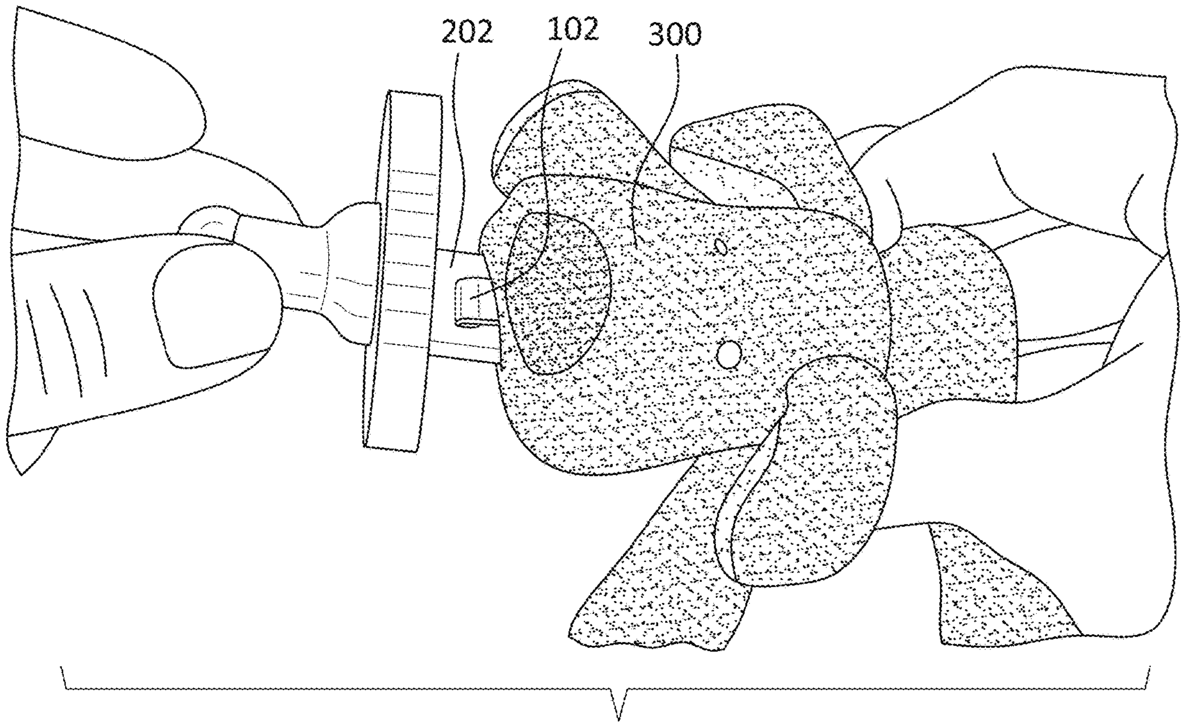
Figure 6D:
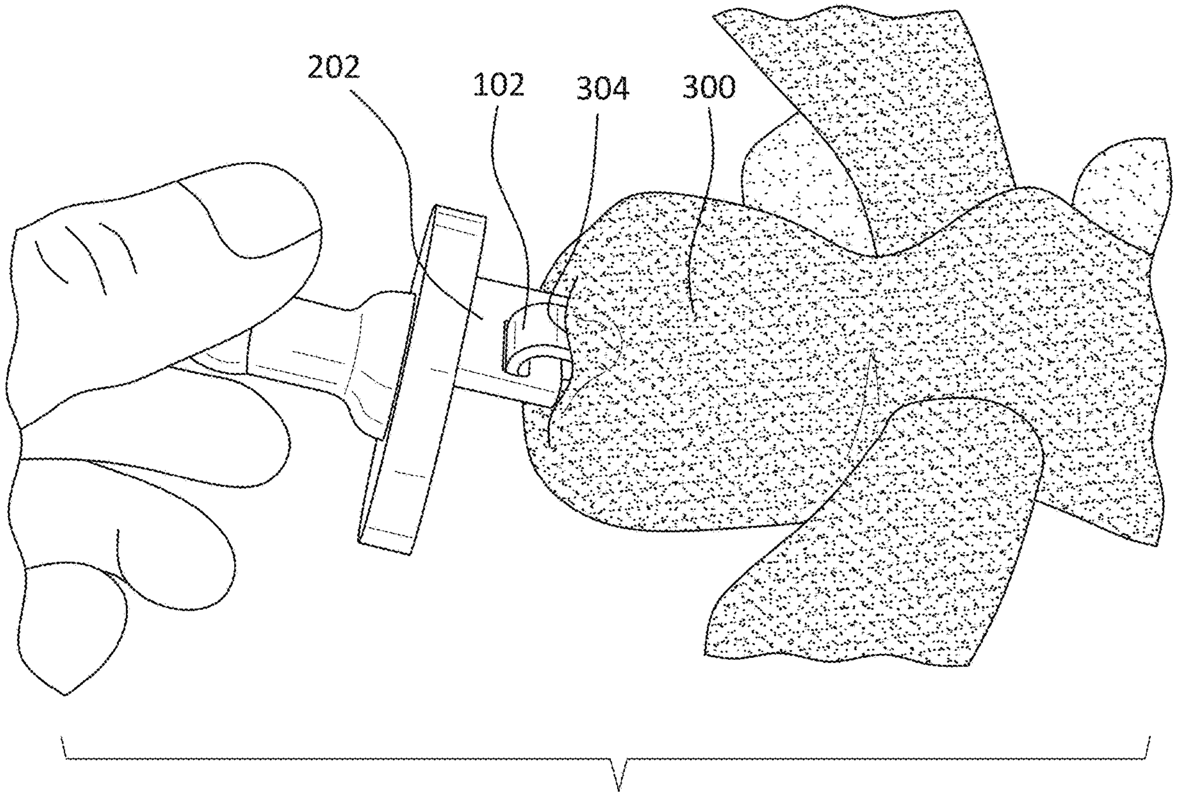

FIGS. 6A-6D illustrate how the pacifier 200 is releasably attached to the clip 102, which is permanently and non-releasably attached to the toy 300. The configurations of the clip and the toy are substantially the same as those shown in FIGS. 1-3 and 5, and the configuration of the pacifier is substantially the same as the one shown in FIG. 4. As shown in FIG. 6A, the clip portion 102 of the clip 100 is extended from or pulled out of the cavity in the plush toy through the external opening and the user pushes on the gate portion 108 of the clip portion 102 to open the gate. As shown in FIG. 6B, the pacifier 200 is attached to the clip 100 by passing the hook 106*a* of the clip portion 102 through the opening in the tab 202 of the pacifier and releasing the gate portion 108 to close the gate. As shown in FIGS. 6C and 6D, the clip portion 102 attached to the tab 202 of the pacifier is retracted into the cavity in the plush toy through the external opening in the cavity. In FIGS. 6C and 6D, the clip portion is partially enclosed by the cavity and the end of the pacifier tab is inserted into the cavity. In other embodiments, the whole clip portion may be enclosed by the cavity with at least a portion or the whole pacifier tab being inserted into the cavity. In yet other embodiments, a portion of the clip portion is enclosed by the cavity without enclosing any portion of the pacifier tab. In any case, whether any portion of the pacifier tab is enclosed by the cavity is dependent on the length of the pacifier tab and the location of the opening within the pacifier tab.

FIGS. 7A-G show another method of detaching and attaching the pacifier 200 to the clip portion 102 of the clip, which is securely and non-releasably attached to the plush toy 300 via the flexible legs 104*a*, 104*b*. As can be seen in FIGS. 7A-G, the clip and the pacifier 200 have substantially the same configurations as the clip 100 and pacifier 200 shown in FIGS. 1-5.

Figure 7A:
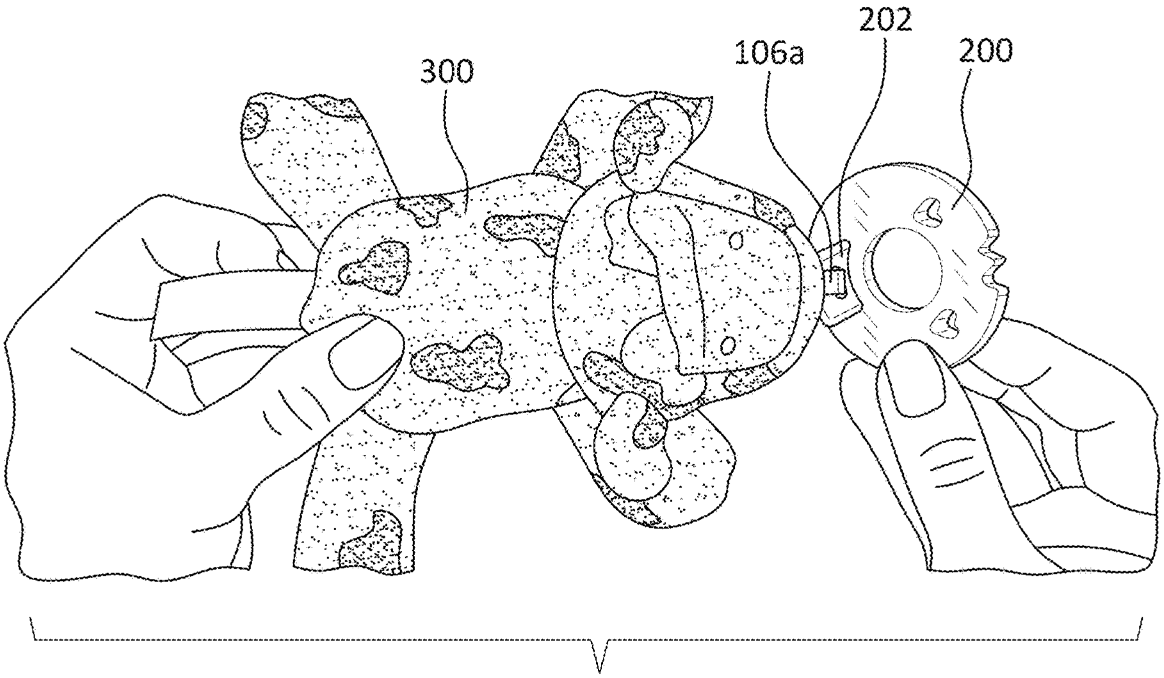
FIGS. 7A-7G show another process of detaching and attaching the pacifier to the clip.
Figure 7B:
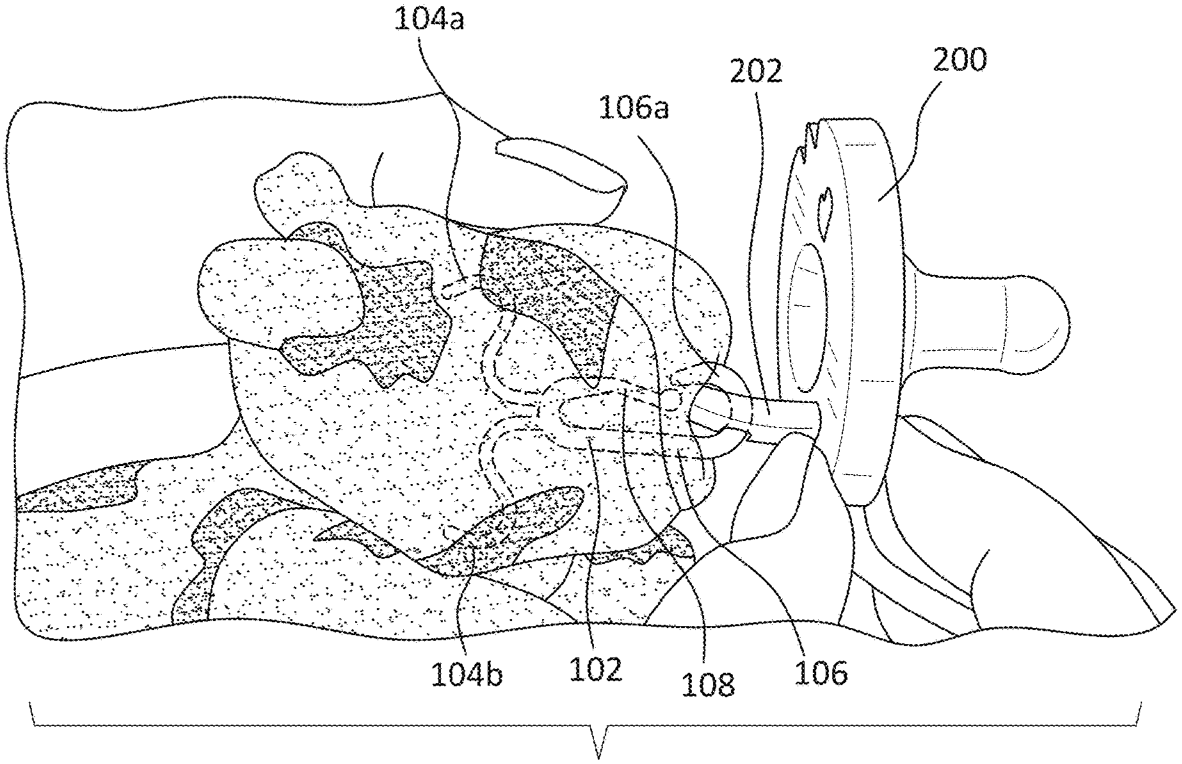
Figure 7C:
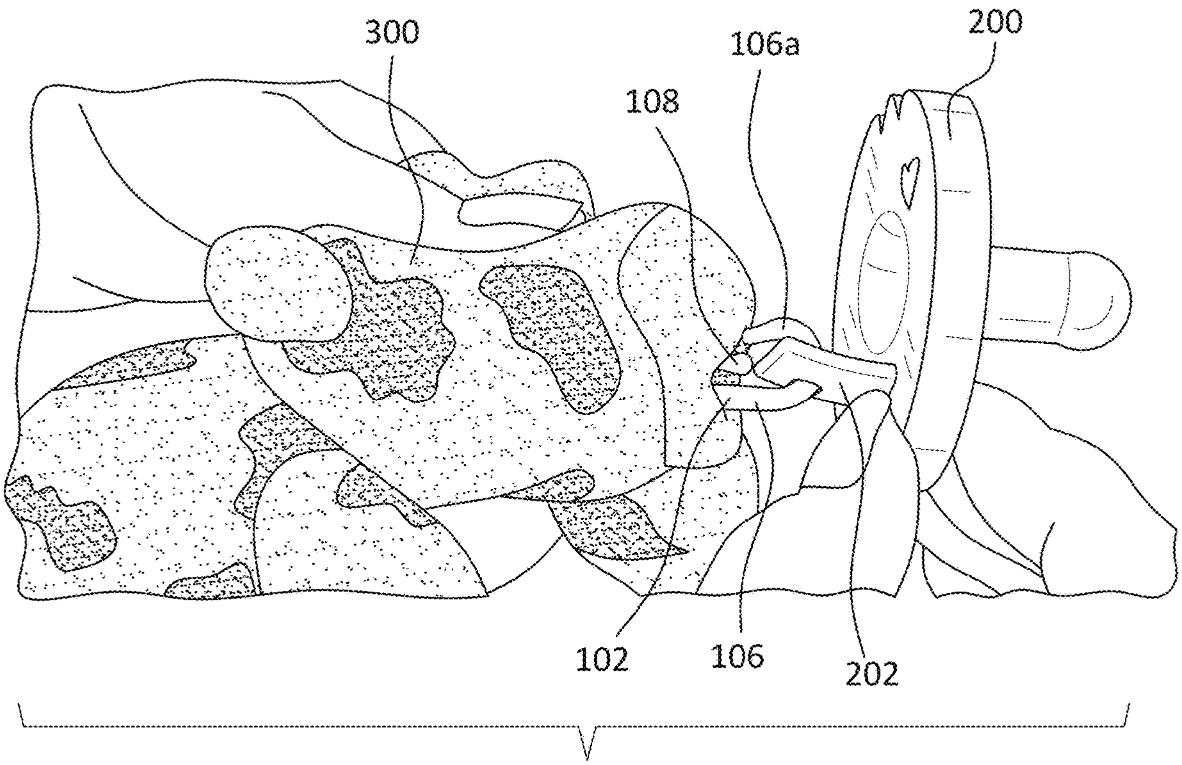

As shown in FIGS. 7A-7B, the clip portion 102 is at least partially enclosed within a cavity in the plush toy 300 in an unflexed, retracted position, so that an end of the hook 106*a* is visible from the cavity and the remaining portions of the clip are inside the cavity. In the embodiment of FIGS. 7A-7B, the tab 202 of the pacifier 200 is not enclosed by the cavity in the plush toy, but in other embodiments, a distal end of the tab 202 may be enclosed by the cavity. FIG. 7B shows the positioning of the clip 100 within the plush toy 300, wherein the flexible legs 104*a*, 104*b* are attached to the interior of the toy 300, and in particular to the interior of a head portion of the toy 300. In the specific configuration of FIG. 7B, the clip 100 is oriented within the toy so that one of the flexible legs 104*a* is attached to a top portion of the toy's head and the other flexible leg 104*b* is attached to a bottom portion of the toy's head, and the clip portion 102 extends through a cavity formed in a mouth portion of the toy's head. As can be seen in FIG. 7B, when the clip 100 is in the retracted position, at least a portion of the clip portion 102 is enclosed within the cavity in the toy such that the gate portion 108 is enclosed by the cavity. This positioning of the clip 100 within the toy 300 and within the cavity in the toy 300 allows the user to feel the flexible legs 104*a*, 104*b* within the toy and to press on the top and bottom of the toy's head, e.g., squeeze the top and bottom of the toy's head, so as to flex the flexible legs 104*a*, 104*b* and to extend the clip portion 102 from the cavity in the toy as shown in FIG. 7C. In addition, as shown in FIG. 7C, when the clip portion 102 is extended from the cavity, the gate portion 108 of the clip portion 102 is opened due to the pressing force on the top and bottom of the toy's head by the user.

In other embodiments, the orientation of the clip 100 and the attachment of the flexible legs 104*a*, 104*b* may be different from the one shown in FIG. 7B. For example, the flexible legs 104*a*, 104*b* may be attached internally within the toy to the sides of the toy's head or another portion of the toy, so that when the user squeezes the sides of the toy's head or the other portion, the clip portion 102 is extended from the cavity. Other positions and orientations of the clip 100 relative to the toy and attachment of the flexible legs 104*a*, 104*b* to the inside of the toy are also contemplated by this invention.

Figure 7D:
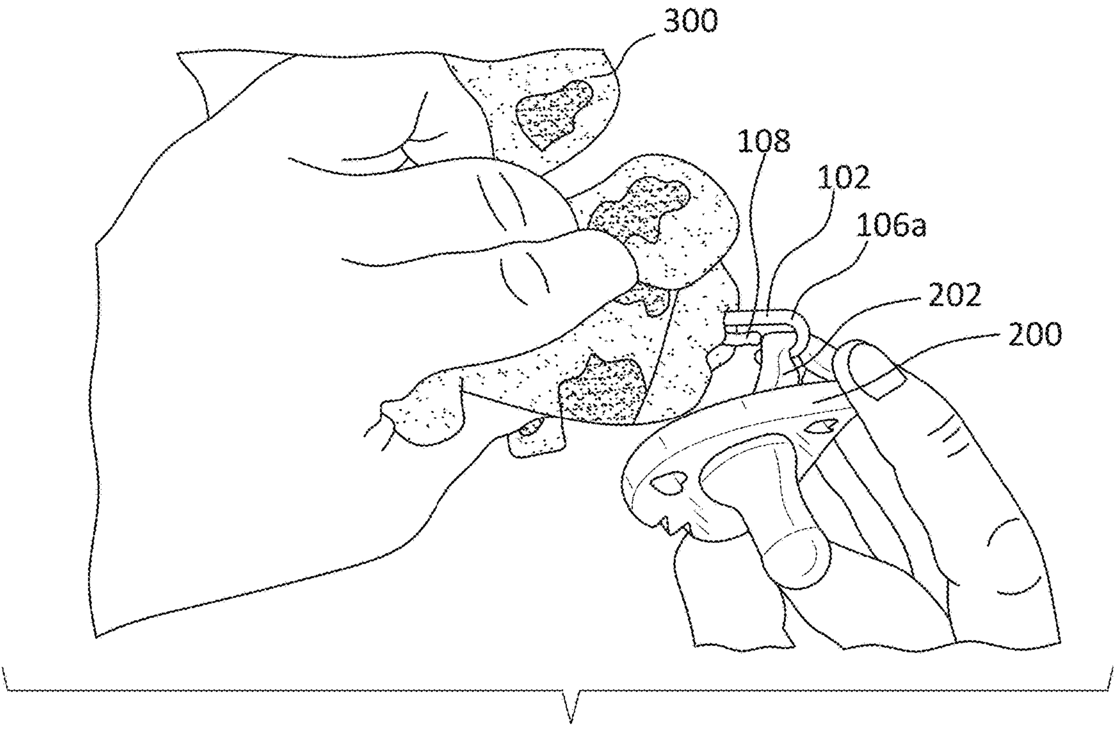
Figure 7E:
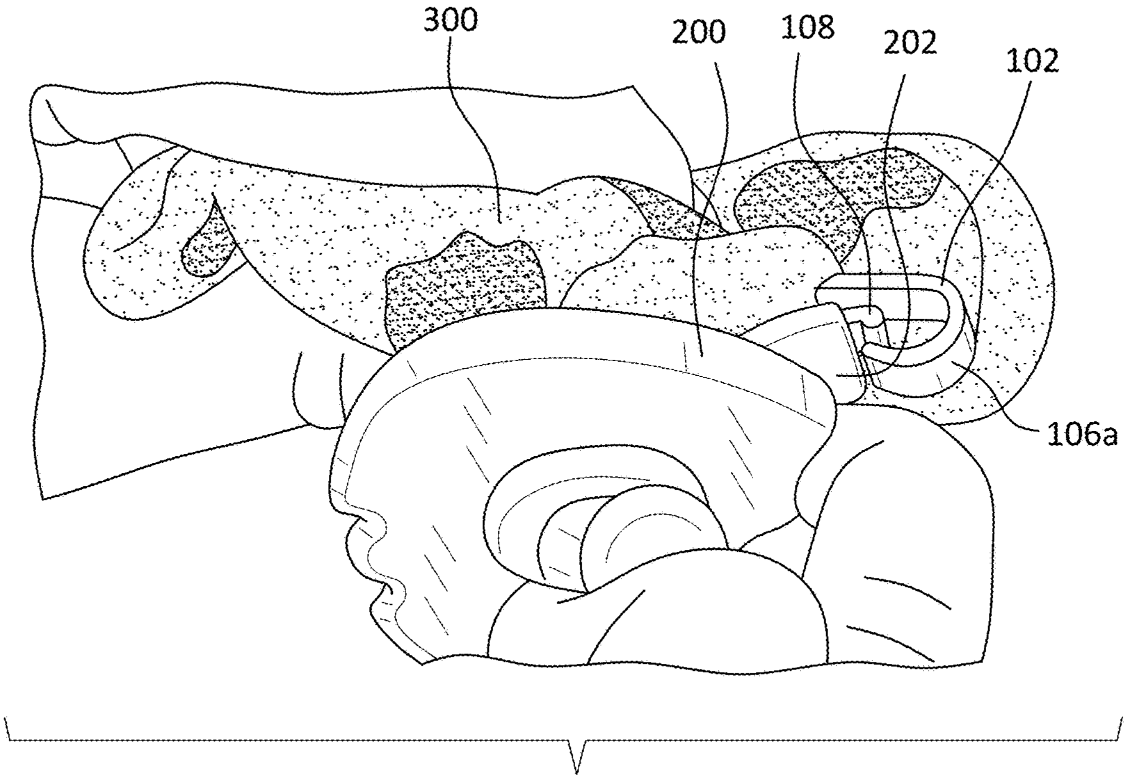
Figure 7F:
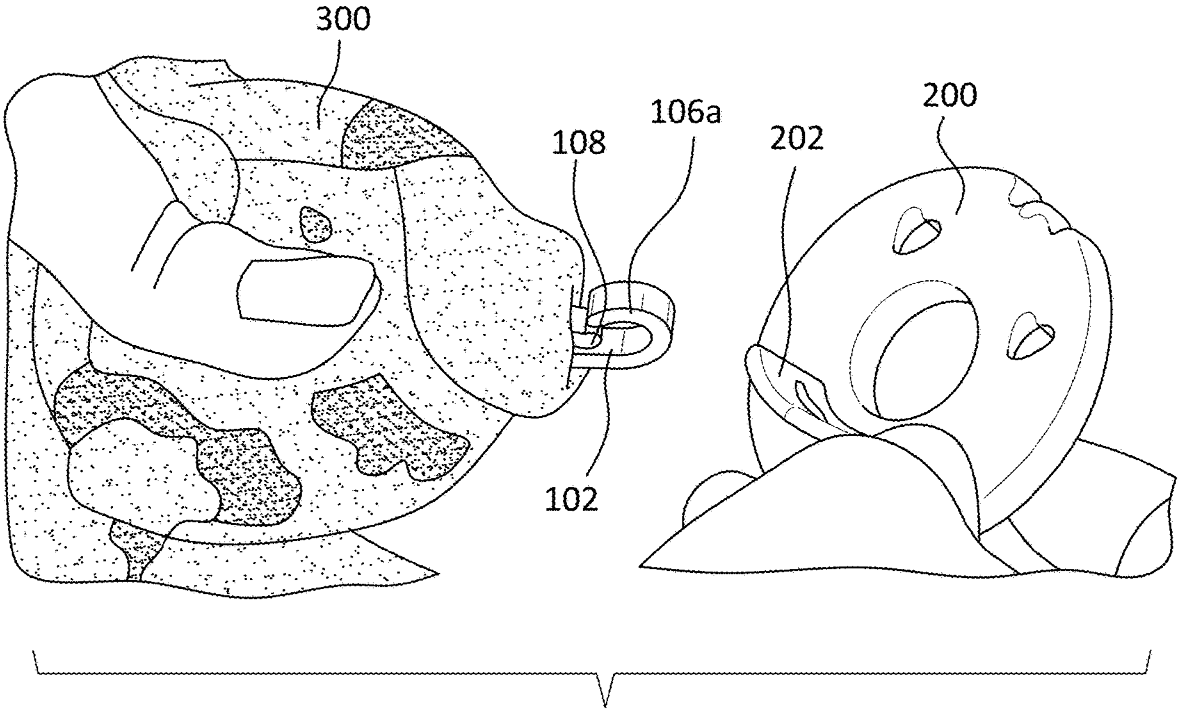

As shown in FIGS. 7D-7F, the pacifier 200 can be detached from the clip portion 102, while the clip portion 102 is extended from the cavity in the toy 300 by sliding the tab 202 of the pacifier around the hook 106*a* and through the opening between the hook 106*a* and the gate portion 108. During the detachment process, the user continues to press on the head of the toy so that the clip portion 102 remains extended from the cavity in the toy.

Figure 7G:
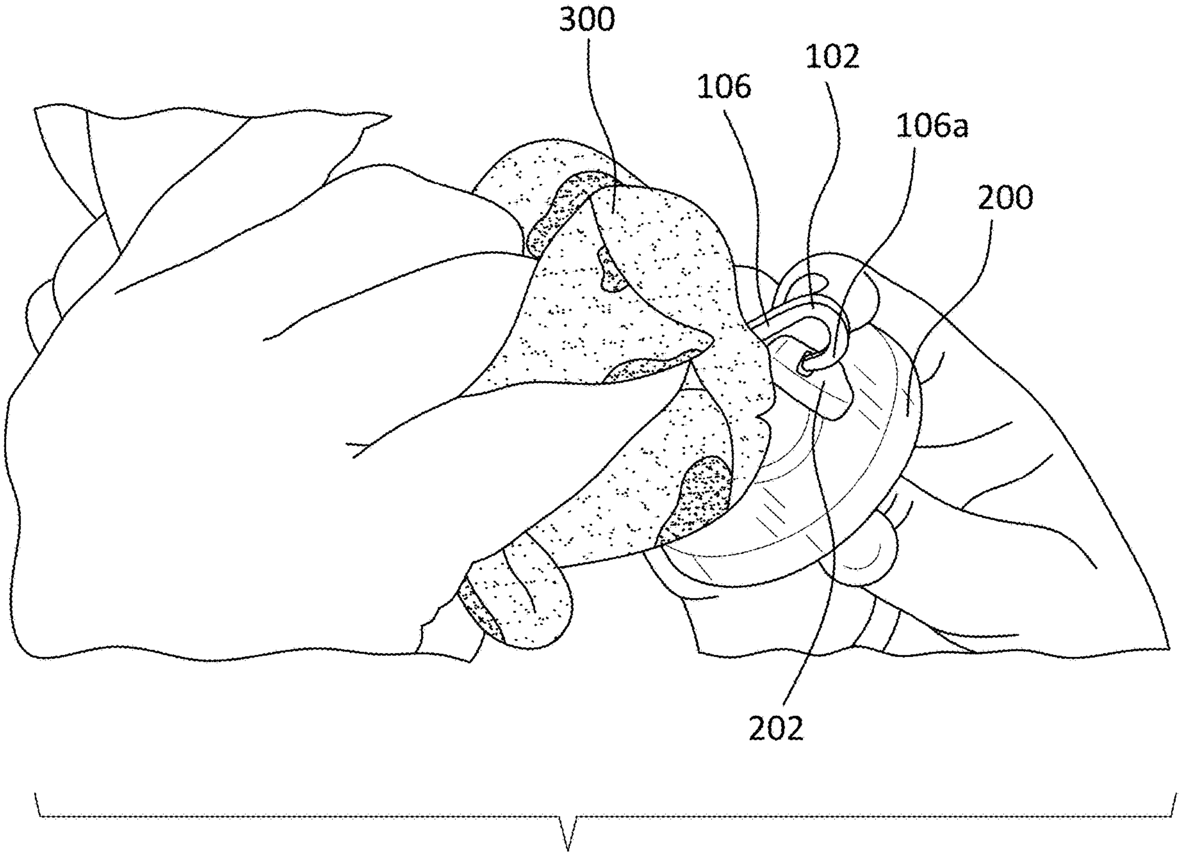

FIG. 7G shows the pacifier 200 being re-attached to the clip portion 102 of the clip 100. As shown in FIG. 7G, the head of the toy is squeezed by the user so as to flex the flexible arms 104*a*, 104*b* to pivot them and bring them closer together and to thereby extend the clip portion 102 from the cavity in the toy 300. As a result, the hook 106*a* is extended from the cavity and is exposed to the outside, and the gate portion 108 is pressed down to the open position. In the illustrative example shown, when the user presses on the flexible arms within the toy so as to bring them closer to one another, the user simultaneously also presses down on the gate portion 108 of the clip 102 so as to open the gate. In other embodiments, the gate portion 108 may need to be pressed or moved separately to bring it to the open position. When the hook 106*a* is exposed and the gate portion 108 is brought into the open position, as can be seen in FIG. 7G, the hook 106*a* is passed through the opening in the tab 202 of the pacifier. With other configurations of the pacifier, the hook 106*a* may be passed through a ring opening in the pacifier or through an opening in another part of the pacifier. After the hook 106*a* is passed through the opening in the tab 202, the user releases the pressing force applied to the toy to close the gate portion 108 and to allow the clip portion 102 to be retracted back into the cavity within the toy.

The above-described clip and plush toy configuration provides for a secure connection of the pacifier to the toy using the clip 100 that prevents an infant from detaching the pacifier when it is connected to the clip. In addition, the above-described configuration allows for at least a portion of the clip and in some cases for a portion of the pacifier tab to be hidden in the cavity within the toy so that a small child does not try to disconnect the pacifier from the clip. Although the attachment and detachment of the pacifier to and from the clip requires sufficiently advanced motor skills, which infants typically do not possess, the attachment and detachment processes are easy and straight forward for an adult to accomplish without requiring advanced manipulation of the clip or the toy. Moreover, as described above, the pacifier can be securely connected to the clip, while minimizing rotation and movement or shifting of the pacifier relative to the clip. Furthermore, when the pacifier is detached from the clip, at least a portion of the clip or the entire clip is retracted into the cavity within the toy, so that the toy can be safely used by a child without the pacifier.

In all cases, it is understood that the above-described arrangements are merely illustrative of the many possible specific embodiments which represent applications of the present invention. Numerous and varied other arrangements, including use of different materials and various configurations of components of the clip, the toy and the pacifier, as well as different arrangements of the clip and toy assembly, including different attachments of the clip to the toy, can be readily devised without departing from the spirit and scope of the invention.

The present application claims priority to U.S. Provisional patent application No. 63/224,195, which is incorporated herein by reference.

We claim:

1. A toy assembly comprising:

a toy having a cavity formed therein and an opening for accessing the cavity; and a retractable clip including a clip portion configured to releasably attach a pacifier to the clip and at least one flexible arm configured to non-releasably attach to an interior of the toy, wherein the retractable clip is configured to move between a retracted position and an extended position relative to the toy, wherein in the retracted position, the at least one flexible arm is positioned inside the toy and at least a portion of the clip portion is enclosed within the cavity formed in the toy, and in the extended position, the clip portion is extended from the cavity through the opening so as to elongate the retractable clip and to enable attachment of the pacifier to the clip.

2. The toy assembly in accordance with claim 1, wherein in the extended position, the clip portion is extended from the cavity without exposing the at least one flexible arm.

3. The toy assembly in accordance with claim 1, wherein the at least one flexible arm is configured to bias the clip portion into the retracted position and is further configured to flex so as to move the clip portion into the extended position upon application of a force.

4. The toy assembly in accordance with claim 1, wherein:

the at least one flexible arm extends from a proximal end of the clip portion, the clip portion comprises a spine extending from the proximal end of the clip portion into a hook formed at a distal end of the clip portion, and the clip portion further includes a gate portion configured to move between a closed position adjacent to the hook and an open position forming a space between the gate portion and the hook.

5. The toy assembly in accordance with claim 4, wherein the gate portion at least one of (a) partially overlaps with a tip of the hook; and (b) is offset from the tip of the hook.

6. The toy assembly in accordance with claim 4, wherein:

the pacifier includes a tab with a through opening;

the hook of the clip portion is configured to pass through the through opening in the tab so as to releasably attach the pacifier to the clip portion; and when the pacifier is releasably attached to the clip and the gate portion is in the closed position, the gate portion abuts a distal end of the tab so as to minimize movement of the tab relative to the hook.

7. The toy assembly in accordance with claim 1, wherein the at least one flexible arm includes a first arm and a second arm extending from a proximal end of the clip portion, wherein the first arm extends from the proximal end of the clip portion in a first direction and the second arm extends from the proximal end of the clip portion in a second direction different from the first direction.

8. A toy assembly comprising:

a toy having a cavity formed therein and an opening for accessing the cavity; and a retractable clip including a clip portion configured to releasably attach a pacifier to the clip and first and second flexible arms configured to non-releasably attach to an interior of the toy, wherein the clip is configured to move between a retracted position and an extended position relative to the toy, wherein in the retracted position, the first and second flexible arms are positioned inside the toy and at least a portion of the clip portion is enclosed within the cavity formed in the toy, and in the extended position, the clip portion is extended from the cavity through the opening so as to elongate the retractable clip and to enable attachment of the pacifier to the clip, and wherein the first arm and the second arm extend in opposing directions relative to a longitudinal axis of the clip and wherein the first and second arms are configured to move the clip into the extended position by pivoting towards one another.

9. The toy assembly in accordance with claim 8, wherein the first and second arms are non-releasably secured to the interior of the toy such that the first and second arms are pivoted closer to one another when a predetermined portion of the toy is squeezed.

* * * * *